(12) United States Patent
Vogelaar et al.

(10) Patent No.: US 7,116,712 B2
(45) Date of Patent: Oct. 3, 2006

(54) APPARATUS AND METHOD FOR PARALLEL MULTIMEDIA PROCESSING

(75) Inventors: Rob Vogelaar, Hopewell Junction, NY (US); Johan G. Janssen, South Salem, NY (US); Fons Bruls, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 672 days.

(21) Appl. No.: 10/003,062

(22) Filed: Nov. 2, 2001

(65) Prior Publication Data

US 2003/0085902 A1 May 8, 2003

(51) Int. Cl.
*H04N 7/18* (2006.01)
(52) U.S. Cl. .......................... 375/240.03; 375/240.04; 375/240.05
(58) Field of Classification Search ............. 348/390.1, 348/397; 375/240.02–240.29; 341/67; 386/5
See application file for complete search history.

(56) References Cited

U.S. PATENT DOCUMENTS

| | | | |
|---|---|---|---|
| 5,289,577 A * | 2/1994 | Gonzales et al. | 345/506 |
| 5,396,518 A * | 3/1995 | How | 375/265 |
| 6,275,536 B1 * | 8/2001 | Chen et al. | 375/240.25 |
| 6,313,766 B1 * | 11/2001 | Langendorf et al. | 341/67 |
| 6,647,061 B1 * | 11/2003 | Panusopone et al. | 375/240.12 |
| 6,748,020 B1 * | 6/2004 | Eifrig et al. | 375/240.26 |
| 6,765,966 B1 * | 7/2004 | Vince | 375/240.26 |

* cited by examiner

*Primary Examiner*—Andy Rao

(57) ABSTRACT

An apparatus and method for processing a multimedia digital bitstream is disclosed. The apparatus comprises a processing chain made up of a plurality of media processors. Each media processor processes a portion of the multimedia digital bitstream in real time. Each portion of the multimedia digital bitstream is split into a primary bitstream and a secondary bitstream. The primary bitstream is processed and merged with the unprocessed secondary bitstream. The parallel processing method of the present invention enables the processing chain to output a fully processed bitstream in real time. The processing chain may be used to transcode a high definition (HD) video bitstream in real time using a plurality of bitrate transcoder units.

16 Claims, 7 Drawing Sheets

APPARATUS AND METHOD FOR PARALLEL MULTIMEDIA PROCESSING

TECHNICAL FIELD OF THE INVENTION

The present invention is generally directed to systems and methods for processing multimedia signals, and, in particular, to an apparatus and method for parallel processing multimedia signals. One advantageous embodiment of the present invention comprises an efficient bitrate transcoder for high definition (HD) video signals.

BACKGROUND OF THE INVENTION

The development of high quality multimedia devices, such as set-top boxes, high end televisions, digital televisions, personal televisions, storage products, personal digital assistants (PDAs), wireless Internet devices, etc., is leading to a variety of architectures and to more openness towards new features for these devices. The development of these new products and their ability to display video data in any format has resulted in new requirements and opportunities with respect to video processing and video enhancement algorithms. Most of these devices receive and/or store video in the MPEG-2 format.

Next generation storage devices, such as the blue laser based Digital Video Recorder, will have high definition (HD) capability to some extent. A high definition (HD) program is typically broadcast at twenty million bits per second (20 megabits per second or 20 Mb/s) and encoded according to the MPEG-2 video standard. The storage capacity of a Digital Video Recorder is in the range of approximately twenty Gigabytes (20 GB). This represents about two (2) hours of recording time of HD video per video disc.

To increase the amount of record time per video disc, long play modes can be defined. For example, in a Long Play (LP) mode, a broadcast bitrate of twenty megabits per second (20 Mb/s) may be recorded at a storage bitrate of ten megabits per second (10 Mb/s). This will provide about four (4) hours of recording time per video disc. In an Extended Long Play (ELP) mode, a broadcast bitrate of twenty megabits per second (20 Mb/s) may be recorded at a storage bitrate of five megabits per second (5 Mb/s). This will provide about eight (8) hours of recording time per video disc.

The process of recording a bitstream at a lower rate is referred to as "transcoding" the bitstream. One method of transcoding a high bitrate bitstream involves the steps of decoding the high bitrate bitstream with an MPEG-2 decoder, de-interlacing the bitstream, converting to a lower resolution by applying 2D scaling, re-interlacing the bitstream, and encoding the resulting bitstream at the lower bitrate. Another method of transcoding a high bitrate bitstream involves directly transcoding the bitstream to a lower bitrate without fully decoding and re-coding the video. This method is known as Direct Bitrate Transcoding (DBT).

Media processors are capable of transcoding multimedia data in the MPEG format. If a bitrate transcoder of a media processor is able to transcode MPEG video data at the same rate at which the MPEG video data arrives, then the transcoding process is said to be done in "real time." If the computing resources of the media processor are not sufficient to process the MPEG video data in real time, then completion of the transcoding process will occur after the arrival of the last portion of the MPEG video data.

Media processors can achieve real time performance levels if the media processing requires minimal computing resources or if the size of the MPEG frames to be processed is small. For example, the Trimedia™ family of media processors (TM1100, TM1300) manufactured by Philips Electronics North America Corporation can perform an MPEG video transform on standard definition (SD) MPEG video data in almost real time. A Trimedia™ processor would require approximately two hundred fifty (250) to three hundred (300) megacycles per second to process high definition (HD) MPEG video data. This level of level of processing power is not presently available.

There is therefore a need in the art for an apparatus and method that will enable presently existing media processors to process high definition (HD) MPEG video data to achieve bitrate transcoding of HD video data in real time.

SUMMARY OF THE INVENTION

The present invention generally comprises an apparatus and method for parallel processing multimedia digital signals. The multimedia digital signals are in the form of digital bitstreams. The present invention enables media processors to process high definition (HD) MPEG video data to achieve bitrate transcoding of HD video data in real time.

In an advantageous embodiment of the present invention, the apparatus of the invention comprises a processing chain made up of a plurality of media processors. Each media processor processes a portion of a multimedia digital bitstream in real time. Each portion of the multimedia digital bitstream is split into a primary bitstream and a secondary bitstream. The primary bitstream is processed and merged with the unprocessed secondary bitstream. The processing chain outputs a fully processed bitstream in real time.

The processing chain may be used to transcode a high definition (HD) video bitstream in real time using a plurality of bitrate transcoder units.

In an advantageous embodiment of the present invention, the method of the invention comprises the steps of processing a portion of a multimedia digital bitstream in each of a plurality of media processors in a processing chain; splitting each portion in each media processor into a primary bitstream and a secondary bitstream; processing the primary bitstream; and merging the processed primary bitstream into the unprocessed secondary bitstream.

It is a primary object of the present invention to provide an apparatus and method for parallel processing multimedia digital bitstreams.

It is another object of the present invention to provide an apparatus and method for transcoding multimedia digital bitstreams.

It is an additional object of the present invention to provide an apparatus and method for transcoding high definition (HD) digital video bitstreams in real time.

It is another object of the present invention to provide an apparatus and method for adjusting a clock rate of an output of at least one bitrate transcoder unit in the processing chain of the present invention.

The foregoing has outlined rather broadly the features and technical advantages of the present invention so that those skilled in the art may better understand the Detailed Description of the Invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: the terms "include" and "comprise" and derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as to future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 14, discussed below, and the various embodiments set forth in this patent document to describe the principles of the improved system and method of the present invention are by way of illustration only and should not be construed in any way to limit the scope of the invention. Those skilled in the art will readily understand that the principles of the present invention may also be successfully applied in any type of device for parallel processing multimedia digital signals.

Figure 1:
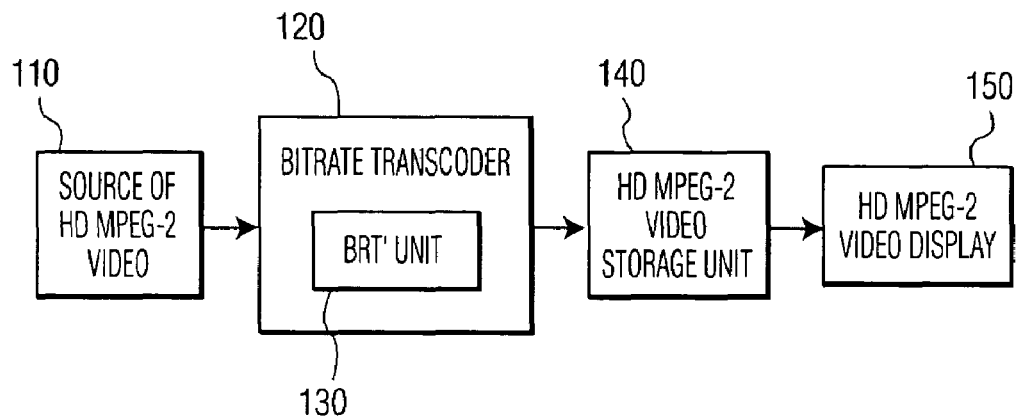
FIG. 1 is a block diagram that illustrates an advantageous embodiment of a bitrate transcoder according to the present invention.

FIG. 1 illustrates an advantageous embodiment of a bitrate transcoder according to the present invention. Source 110 provides high definition (HD) MPEG-2 video data to bitrate transcoder 120. Bitrate transcoder 120 comprises BRT' unit 130. As will be more fully discussed, BRT' transcodes the HD MPEG-2 video data in accordance with the principles of the present invention. The transcoded HD MPEG-2 video data from bitrate transcoder 120 is provided to storage unit 140. Storage unit 140 may comprise a hard disk in a computer or a digital video recorder (DVR). Storage unit 140 provides the transcoded HD MPEG-2 video data to HD video display 150. HD video display may comprise a high definition television (HDTV), a HD computer monitor, or any other type of display unit capable of displaying HD video.

Figure 2:
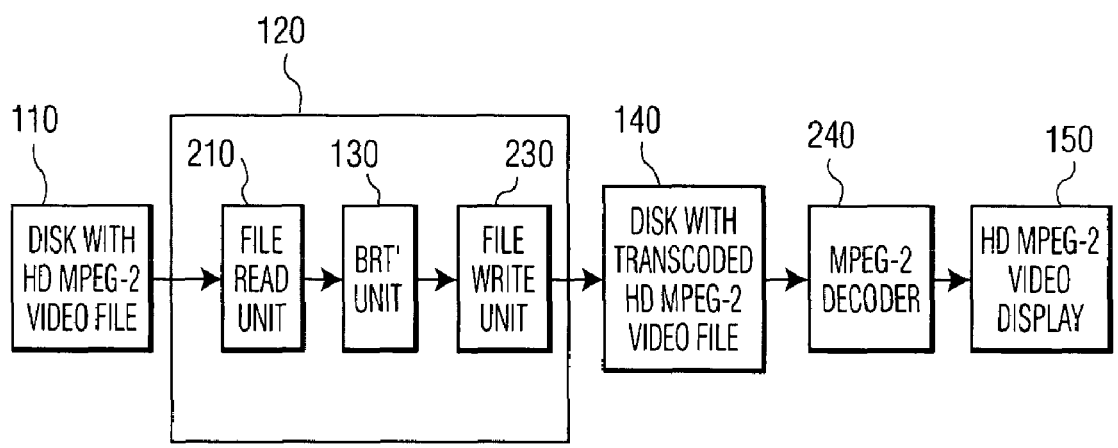
FIG. 2 is a block diagram that illustrates an advantageous embodiment of a bitrate transcoder according to the present invention for transcoding an MPEG-2 video data from a file.

FIG. 2 illustrates another advantageous embodiment of a bitrate transcoder according to the present invention for transcoding an MPEG-2 video data from a file. In this embodiment source 110 comprises a computer hard disk that contains high definition (HD) MPEG-2 video data in a computer file. Source 110 sends the HD data to file read unit 210 of bitrate transcoder 120. File read unit 210 reads the HD MPEG-2 video data and formats the data for BRT' unit 130. BRT' unit 130 transcodes the HD MPEG-2 video data in accordance with the principles of the present invention. The transcoded HD MPEG-2 video data from BRT' unit 130 is provided to file write unit 230. File write unit 230 formats and writes the data to storage unit 140. In this embodiment storage unit 140 comprises a computer hard disk that contains the transcoded HD MPEG-2 video data in a computer file.

The transcoded data in storage unit 140 is provided to MPEG-2 decoder 240. MPEG-2 decoder 240 decodes the transcoded HD MPEG-2 video data and provides the decoded data to HD video display 150. As before, HD video display 150 may comprise a high definition television (HDTV), a HD computer monitor, or any other type of display unit capable of displaying HD video.

Figure 3:
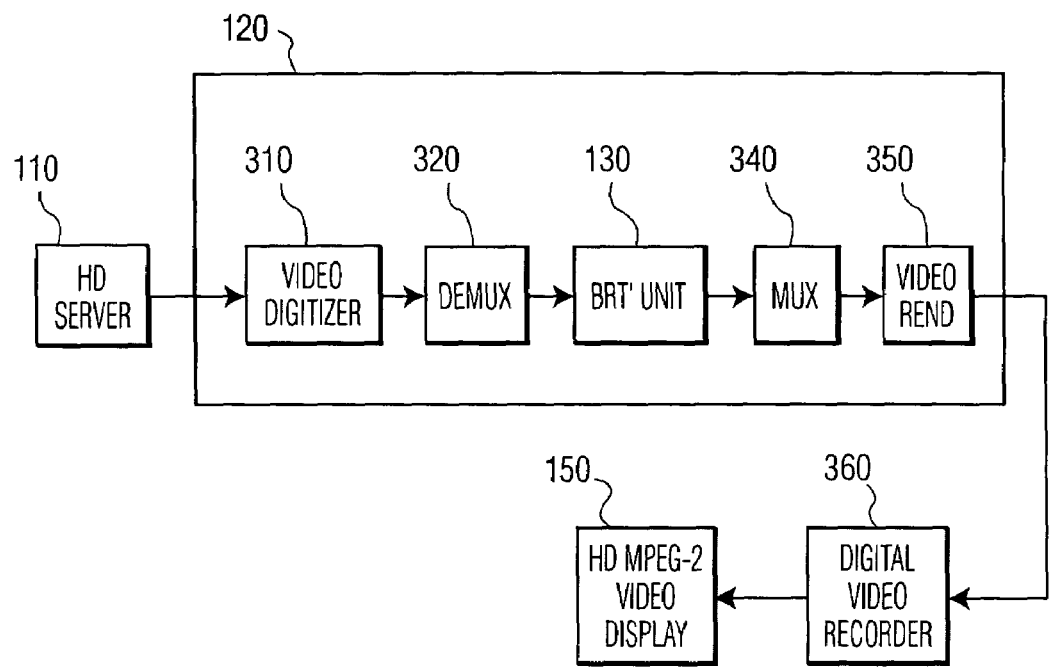
FIG. 3 is a block diagram that illustrates an advantageous embodiment of a bitrate transcoder according to the present invention for transcoding an MPEG-2 video stream from a high definition (HD) server.

FIG. 3 illustrates another advantageous embodiment of a bitrate transcoder according to the present invention for transcoding an MPEG-2 video data from a high definition (HD) server 110. High definition (HD) 110 provides a HD transport stream to video digitizer 310 of bitrate transcoder 120. Video digitizer 310 provides the digitized video to demultiplexer 320. Demultiplexer 320 obtains an MPEG-2 elementary stream from the HD transport stream and provides the MPEG-2 elementary stream to BRT' unit 130.

BRT' unit 130 transcodes the HD MPEG-2 video data in accordance with the principles of the present invention. The transcoded HD MPEG-2 video data from BRT' unit 130 is provided to multiplexer 340. Multiplexer 340 multiplexes the MPEG-2 elementary stream from BRT' unit 130 to a transport stream. Multiplexer 340 then provides the HD transport stream to Video Rend unit 350. Video Rend unit 350 provides the transcoded HD MPEG-2 video data to Digital Video Recorder 360. Upon receiving an instruction to display the transcoded video data Digital Video Recorder 360 plays the video program on HD video display 150. As previously mentioned, HD video display 150 may comprise a high definition television (HDTV), a HD computer monitor, or any other type of display unit capable of displaying HD video. In an alternate advantageous embodiment of the present invention, bitrate transcoder 120 may be contained within a television unit. A television unit may be a television receiver or a television set top box.

Figure 4:
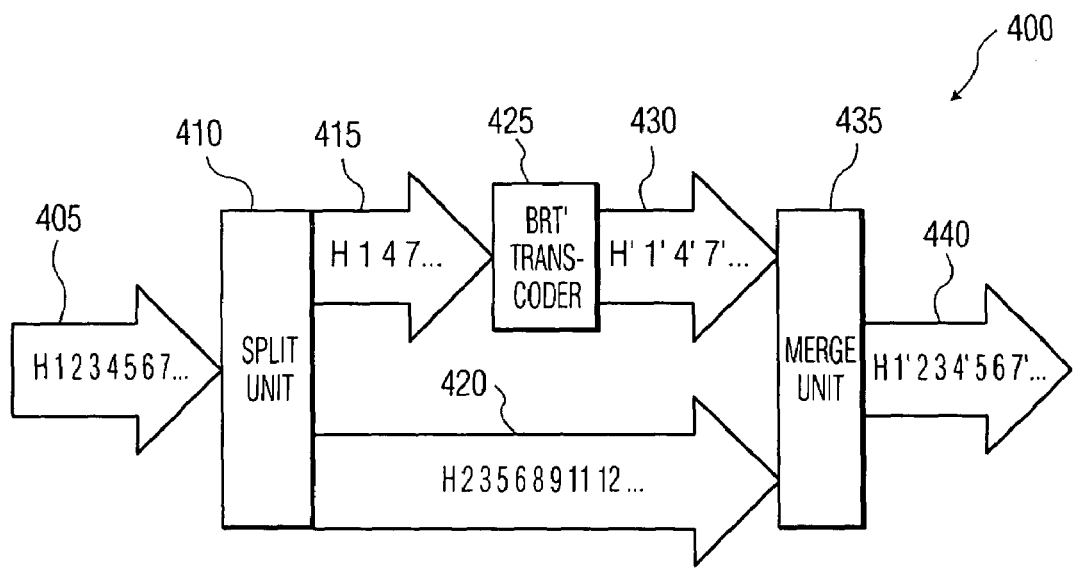
FIG. 4 is a block diagram that illustrates a first portion of the operation of a bitrate transcoder according to the present invention in which a first interleaved portion of a bitstream is transcoded.

FIG. 4 is a block diagram that illustrates a first portion of the operation of BRT' unit 130. The first portion of the operation is generally designated with the reference numeral 400. The incoming bitstream 405 is represented by a series of numbers "1, 2, 3, 4, 5, 6, 7, . . . " Each number represents a portion or "slice" of bitstream 405. The letter "H" designates a portion of bitstream 405 that comprises a header. Split unit 410 splits bitstream 405 into a primary stream 415 and a secondary stream 420. As indicated in FIG. 4, primary stream 415 comprises the header "H" and the portions of bitstream 415 represented by the numbers "1, 4, 7, . . . " Secondary stream 420 comprises the remainder of bitstream 405. That is, secondary stream 420 comprises the header "H" and the portions of bitstream 405 represented by the numbers "2, 3, 4, 5, 6, 8, 9, 11, 12, . . . "

BRT' transcoder 425 transcodes primary stream 415 to produce transcoded primary stream 430. Primary transcoded stream 430 comprises transcoded header "H'" and transcoded portions of bitstream 405 represented by the numbers "1', 4', 7', . . . ". The prime on a numbered slice of bitstream indicates that the transcoding operation has been performed on that slice of bitstream. Transcoded primary stream 430 and secondary stream 420 are combined in merge unit 435 to create partially transcoded stream 440. As shown in FIG. 4, partially transcoded stream 440 comprises the header "H" and the portions of bitstream 405 represented by the numbers "1', 2, 3, 4', 5, 6, 7', . . . " The transcoded header "H'" is not used because stream 440 is not fully transcoded. At this stage of the operation one third (⅓) of the bitstream slices of bitstream 405 have been transcoded.

Figure 5:
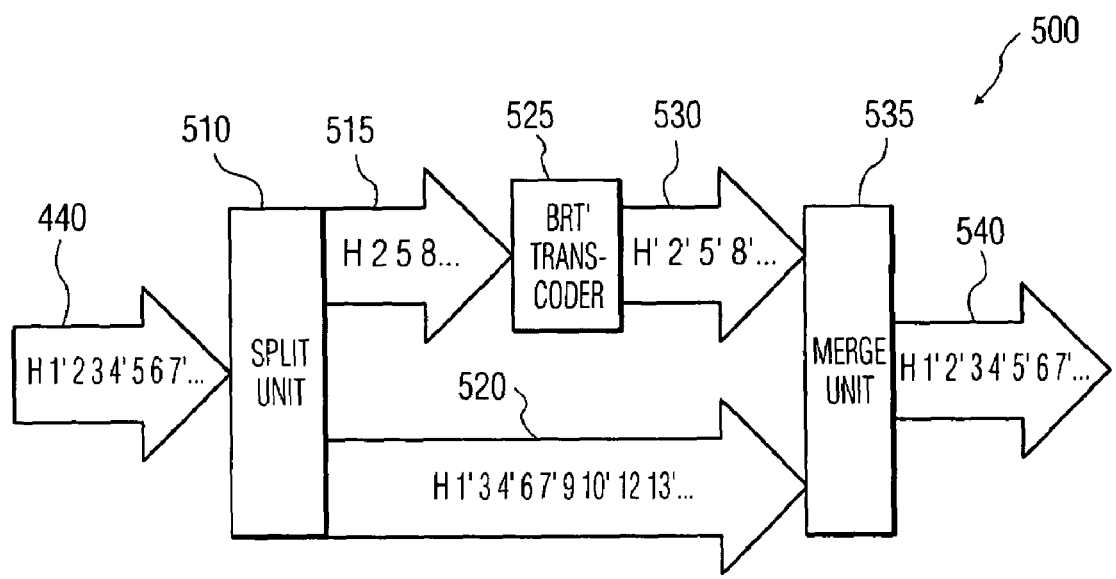
FIG. 5 is a block diagram that illustrates a second portion of the operation of a bitrate transcoder according to the present invention in which a second interleaved portion of the bitstream of FIG. 4 is transcoded.

FIG. 5 is a block diagram that illustrates a second portion of the operation of BRT' unit 130. The second portion of the operation is generally designated with the reference numeral 500. The incoming bitstream 440 is the same as the output from the first portion of the operation 400. Bitstream 440 is represented by the series of numbers "1', 2, 3, 4', 5, 6, 7', . . . " Each number represents a portion or "slice" of bitstream 440. The letter "H" designates a portion of bitstream 440 that comprises a header. Split unit 510 splits bitstream 440 into a primary stream 515 and a secondary stream 520. As indicated in FIG. 5, primary stream 515 comprises the header "H" and the portions of bitstream 440 represented by the numbers "2, 5, 8, . . . " Secondary stream 520 comprises the remainder of bitstream 440. That is, secondary stream 520 comprises the header "H" and the portions of bitstream 440 represented by the numbers "1', 3, 4', 6, 7', 9, 10', 12, 13', . . . "

BRT' transcoder 525 transcodes primary stream 515 to produce transcoded primary stream 530. Primary transcoded stream 530 comprises transcoded header "H'" and transcoded portions of bitstream 440 represented by the numbers "2', 5', 8', . . . ". Transcoded primary stream 530 and secondary stream 520 are combined in merge unit 535 to create partially transcoded stream 540. As shown in FIG. 5, partially transcoded stream 540 comprises the header "H" and the portions of bitstream 440 represented by the numbers "1', 2', 3, 4', 5', 6, 7', . . . " The transcoded header "H'" is not used because stream 540 is not fully transcoded. At this stage of the operation two thirds (⅔) of the bitstream slices of bitstream 405 have been transcoded.

Figure 6:
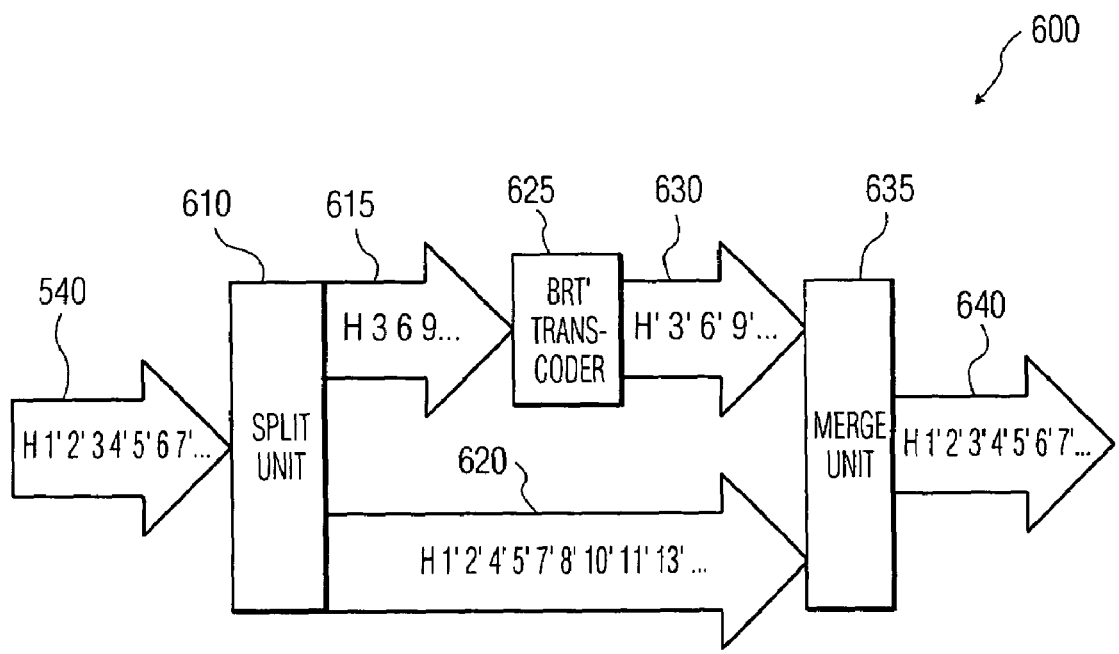
FIG. 6 is a block diagram that illustrates a third portion of the operation of a bitrate transcoder according to the present invention in which a third interleaved portion of the bitstream of FIG. 4 is transcoded.

FIG. 6 is a block diagram that illustrates a third portion of the operation of BRT' unit 130. The third portion of the operation is generally designated with the reference numeral 600. The incoming bitstream 540 is the same as the output from the second portion of the operation 500. Bitstream 540 is represented by the series of numbers "1', 2', 3, 4', 5', 6, 7', . . . " Each number represents a portion or "slice" of bitstream 540. The letter "H" designates a portion of bitstream 540 that comprises a header. Split unit 610 splits bitstream 540 into a primary stream 615 and a secondary stream 620. As indicated in FIG. 6, primary stream 615 comprises the header "H" and the portions of bitstream 540 represented by the numbers "3, 6, 9, . . . " Secondary stream 620 comprises the remainder of bitstream 540. That is, secondary stream 620 comprises the header "H" and the portions of bitstream 540 represented by the numbers "1', 2', 4', 5', 7', 8', 10', 11', 13', . . . "

BRT' transcoder 625 transcodes primary stream 615 to produce transcoded primary stream 630. Primary transcoded stream 630 comprises transcoded header "H'" and transcoded portions of bitstream 540 represented by the numbers "3', 6', 9', . . . ". Transcoded primary stream 630 and secondary stream 620 are combined in merge unit 635 to create fully transcoded bitstream 640. As shown in FIG. 5, fully transcoded bitstream 640 comprises the transcoded header "H'" and the fully transcoded bitstream 405 represented by the numbers "1', 2', 3', 4', 5', 6', 7', . . . " The transcoded header "H'" is used because bitstream 640 is fully transcoded. At this stage of the operation all of the bitstream slices of bitstream 405 have been transcoded.

In the advantageous embodiment illustrated in FIG. 4, FIG. 5, and FIG. 6, BRT' unit 130 comprises three (3) units. The first unit comprises split unit 410, BRT' transcoder 425, and merge unit 435. The second unit comprises split unit 510, BRT' transcoder 525, and merge unit 535. The third unit comprises split unit 610, BRT' transcoder 625, and merge unit 635. It is understood that this embodiment is presented as an example and that the present invention is not limited to the use of three BRT' transcoder as shown in this embodiment. For example, the parallel processing apparatus and method of the present invention may comprise a processing chain of two BRT' transcoders. The parallel processing apparatus and method of the present invention may also comprise a processing chain of four or more BRT' transcoders.

Thus the apparatus and method of the present invention is capable of splitting and merging an MPEG-2 video bitstream by the slice parsing method described above. An unlimited number of BRT' transcoders may be used in which each BRT' transcoder processes a selected number of slices of the MPEG-2 video bitstream. Any number of BRT' transcoders may be cascaded in a processing chain in the manner described for three BRT' transcoders.

The apparatus and method of the present invention achieves perfect load balancing because each BRT' transcoder is fed with slices that represent small areas from the entire MPEG picture. The processing is executed in parallel. However, it is not necessary to merge all the parallel processed outputs at the end of the process. This is because a partial merging occurs in each merge unit that is associated with each BRT' transcoder in the processing chain. Each BRT' transcoder in the chain contains a simple single input interface and a simple single output interface. This arrangement allows multimedia data (such as HD MPEG-2 video data) to be processed in real time.

Figure 7:
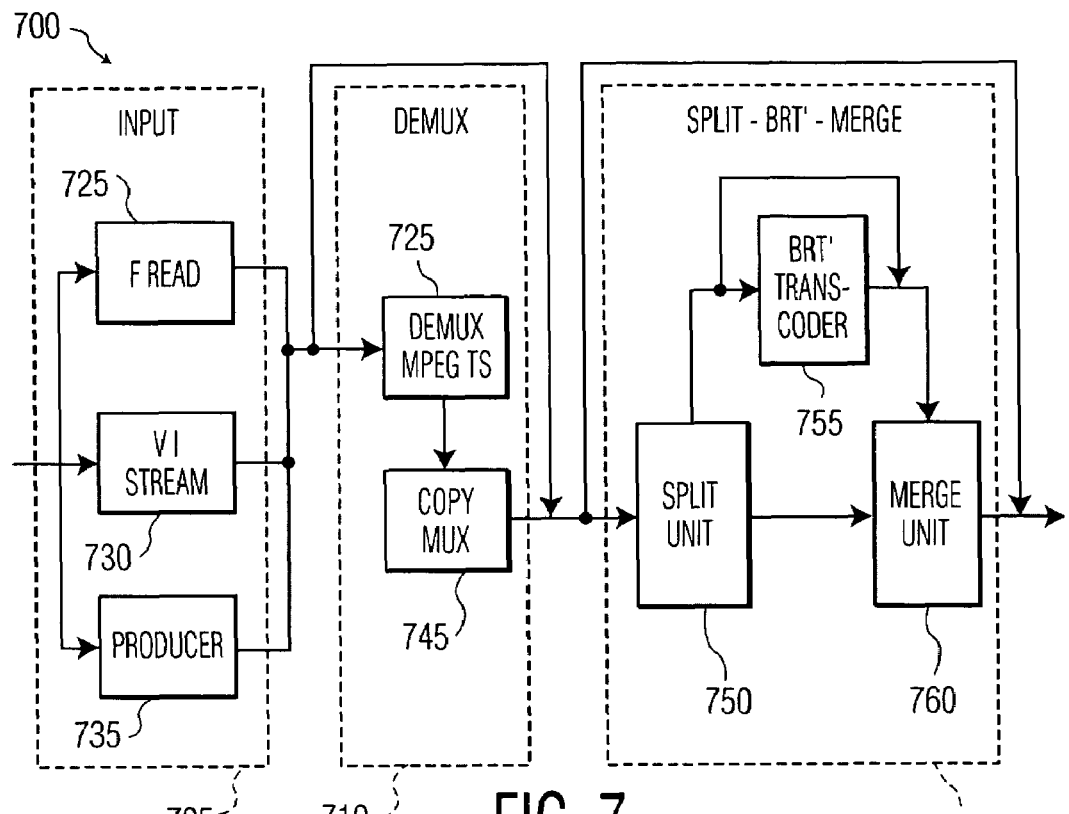
FIG. 7 is a block diagram that illustrates an input block, a demultiplexer block, and a processing block of one advantageous embodiment of a bitrate transcoder according to the present invention.

FIG. 7 illustrates an input block 705, a demultiplexer block 710, and a bitrate transcoding processing block 725 of one advantageous embodiment of a bitrate transcoder of the present invention. Input block 705 comprises three parallel input modules. "F Read" input module 725 accepts multimedia data in a computer file format. "F Read" input module 725 accepts multimedia data from a PCI bus or other similar devices that use a file input/output format. "V I Stream" input module 730 accepts multimedia data in real time from a bitpump or radio frequency (RF) front end. The initials "V I" stand for "Video In." "Producer" input module 735 is a development test tool that is capable of generating bitstreams for testing purposes.

Demultiplexer block 710 comprises two modules. Demultiplexer MPEG TS module 725 receives multimedia data from input block 705. Demultiplexer MPEG TX module 725 demultiplexes a video elementary stream from the incoming transport stream. Copy Mux module 745 receives the video elementary stream and reorders the output buffers from Demultiplexer MPEG TX module 725 into single buffer packets that are required by downstream components. Copy Mux module 745 does not perform any video processing.

The data then passes from Copy Mux module 745 to bitrate transcoding processing block 715. Split unit 750 in processing block 715 splits the bitstream into a primary stream and a secondary stream in the manner previously described. BRT' transcoder 755 transcodes the primary stream. Merge unit 760 then merges the transcoded primary stream and the secondary stream in the manner previously described. The output of transcoding processing block 715 is a partially transcoded bitstream.

Figure 8:
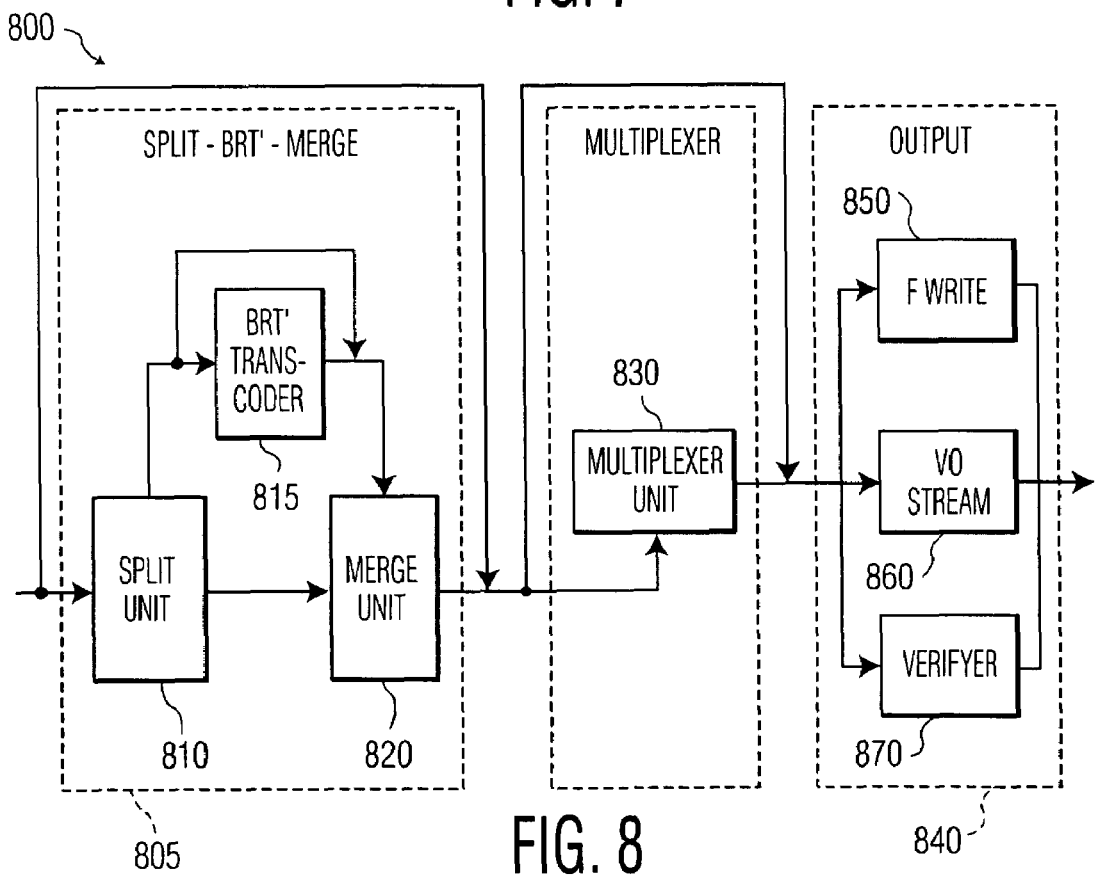
FIG. 8 is a block diagram that illustrates a processing block, a multiplexer block, and an output block of one advantageous embodiment of a bitrate transcoder according to the present invention.

As previously described a particular embodiment of the present invention may comprise a selected number of cascaded processing blocks of the type shown in processing block 715. FIG. 8 illustrates a bitrate transcoding processing block 805 that represents the last processing block in a chain of cascaded processing blocks. The output of processing block 805 is a fully transcoded bitstream.

FIG. 8 also illustrates a multiplexer unit 830 and an output unit 840. Multiplexer unit 830 multiplexes a video elementary stream from processing block 805 into a transport stream thereby reversing the process carried out by demultiplexer 710. The output of multiplexer unit 830 is provided to output unit 840.

Output unit 840 comprises three parallel output modules. "F Write" output module 850 outputs multimedia data in a computer file format. "F Write" output module 850 outputs multimedia data to a PCI bus or other similar devices that use a file input/output format. "V O Stream" output module 860 outputs multimedia data in real time to bitstream destination. The initials "V O" stand for "Video Out." "Verifyer" output module 870 is a development test tool that is capable of verifying and outputting test bitstreams generated by "Producer" input module 735.

Figure 9:
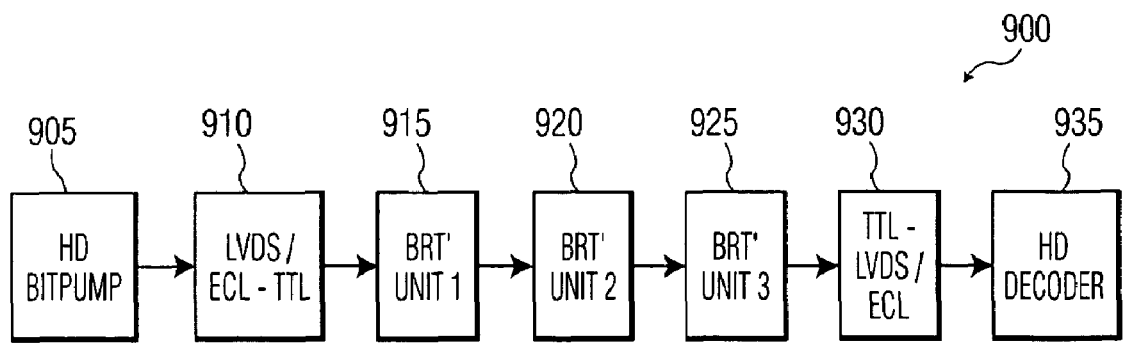
FIG. 9 is a block diagram that illustrates a high definition (HD) transcoding chain for transcoding a HD bitstream of an MPEG-2 video signal in accordance with the present invention.
Figure 10:
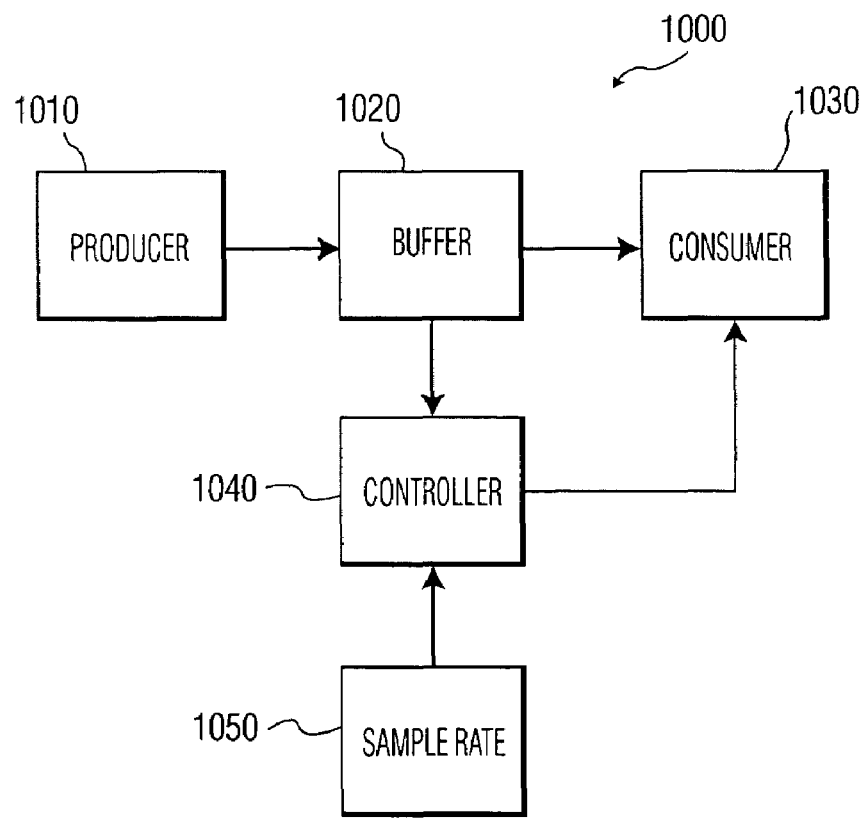
FIG. 10 is a block diagram that illustrates a clock rate control circuit for use with a bitrate transcoder according to the present invention.

FIG. 9 is a block diagram that illustrates a high definition (HD) transcoding chain 900 for transcoding a HD bitstream of an MPEG-2 video signal using the parallel transcoding apparatus and method of the present invention. High definition (HD) bitpump 905 provides a HD bitstream to electrical conversion unit 910. Electrical conversion unit 910 converts the incoming bitstream from a Low Voltage Differential Signal (LVDS) format to either (1) an Emitter Coupled Logic (ECL) format, or (2) a Transistor Transistor Logic (TTL) format, depending upon the format utilized in the BRT' units of transcoding chain 900.

In this exemplary embodiment transcoding chain 900 comprises three (3) BRT' units. They are BRT' Unit Number One 915, BRT' Unit Number Two 920, and BRT' Unit Number Three 925. The fully transcoded output of BRT' Number Three 925 is provided to electrical conversion unit 930. Electrical conversion unit 930 converts the transcoded bitstream from either (1) an Emitter Coupled Logic (ECL) format, or (2) a Transistor Transistor Logic (TTL) format, to a Low Voltage Differential Signal (LVDS) format. Electrical conversion unit 930 then sends the converted transcoded bitstream to high definition (HD) decoder 935.

HD bitpump 905 produces an HD MPEG-2 transport stream. The three BRT' units, 915, 920 and 925, transcode the MPEG-2 transport stream. HD decoder 935 decodes and displays the transcoded video stream in real time.

HD bitpump 905 produces a twenty megabit per second (20 Mb/s) transport stream. The transport stream is demultiplexed in BRT' unit 915 and has one third ($\frac{1}{3}$) of the slices transcoded with a target output bitrate of ten megabits per second (10 Mb/s). The output of BRT' unit 915 is sent out at a rate of twenty megabits per second (20 Mb/s). Because one third ($\frac{1}{3}$) of the stream has been transcoded from 20 Mb/s to 10 Mb/s the output data rate is not 20 Mb/s but is one sixth ($\frac{1}{6}$) less than 20 Mb/s. This is because (1) a first non-transcoded third of the bitstream has a 20 Mb/s rate, and (2) a second non-transcoded third of the bitstream has a 20 Mb/s rate, and (3) the transcoded third of the bitstream has a 10 Mb/s rate.

To keep outputting data from BRT' unit 915 at a fixed data rate of 20 Mb/s, the output component of BRT' unit 915 will generate empty data packets at its output. That is, BRT' unit 915 generates and adds a sufficient number of empty data packets to bring the output data rate of BRT' unit 915 up to 20 Mb/s. An empty data packet has the same size as a full data packet. An empty data packet takes the same amount of time to transmit as a full data packet but the empty data packet contains no data. BRT' unit 915 will send out one (1) empty data packet for every five (5) full data packets. The effective output bitrate of BRT' unit 915 is sixteen and two thirds megabits per second (16$\frac{2}{3}$ Mb/s).

BRT' unit 920 receives the output of BRT' unit 915. BRT' unit 920 is capable of detecting the empty data packets sent by BRT' unit 915. BRT' unit 920 discards the empty data packets. BRT' unit 920 transcodes the second one third ($\frac{1}{3}$) of the slices. This results in an output bitrate of thirteen and one third megabits per second (13$\frac{1}{3}$ Mb/s). This is because (1) the third of the bitstream not yet transcoded has a 20 Mb/s rate, and (2) the first transcoded third of the bitstream has a 10 Mb/s rate, and (3) the second transcoded third of the bitstream has a 10 Mb/s rate. Another way to calculate the output bitrate is to multiply the 20 Mb/s bitrate by the quantity (1⅙–⅙). This is equivalent to 20 Mb/s times the quantity two thirds (⅔). This gives an output bitrate of 13⅓ Mb/s.

To keep outputting data from BRT' unit 920 at a fixed data rate of 20 Mb/s, the output component of BRT' unit 920 will generate empty data packets at its output. That is, BRT' unit 920 generates and adds a sufficient number of empty data packets to bring the output data rate of BRT' unit 920 up to 20 Mb/s. BRT' unit 920 will send out two (2) empty data packets for every three (3) full data packets. The effective output bitrate of BRT' unit 920 is thirteen and one third megabits per second (13⅓ Mb/s).

BRT' unit 925 receives the output of BRT' unit 920. BRT' unit 925 is capable of detecting the empty data packets sent by BRT' unit 920. BRT' unit 925 discards the empty data packets. BRT' unit 925 transcodes the third one third (⅓) of the slices. This results in an output bitrate of ten megabits per second (10 Mb/s). This is because (1) the first transcoded third of the bitstream has a 10 Mb/s rate, and (2) the second transcoded third of the bitstream has a 10 Mb/s rate, and (3) the third transcoded third of the bitstream has a 10 Mb/s rate. Another way to calculate the output bitrate is to multiply the 20 Mb/s bitrate by the quantity (1⅙–⅙–⅙). This is equivalent to 20 Mb/s times the quantity one half (½). This gives an output bitrate of 10 Mb/s.

To keep outputting data from BRT' unit 925 at a fixed data rate of 20 Mb/s, the output component of BRT' unit 925 will generate empty data packets at its output. That is, BRT' unit 925 generates and adds a sufficient number of empty data packets to bring the output data rate of BRT' unit 925 up to 20 Mb/s. BRT' unit 925 will send out one (1) empty data packet for every one (1) full data packet. The effective output bitrate of BRT' unit 925 is ten megabits per second (10 Mb/s).

The fully transcoded bitstream from BRT' unit 925 is to be provided to HD decoder. Because HD decoder 935 is not capable of detecting the empty data packets in the bitstream, the empty data packets must be removed from the bitstream before the bitstream reaches HD decoder 935. This may be accomplished by using a clock rate control circuit 1000 of the type shown in FIG. 10. Clock rate control circuit 1000 may be incorporated within the output component of BRT' unit 925. Clock rate control circuit 1000 adjusts the clock rate of the output of BRT' unit 925 to adjust the rate at which HD decoder 935 receives data from BRT' unit 925.

In clock rate control circuit 1000 producer module 1010 sends data packets to buffer 1020. In one advantageous embodiment buffer 1020 contains a maximum of forty (40) data packets. Each data packet contains forty eight thousand one hundred twenty eight (48,128) bytes. Buffer 1020 may never be completely full or completely empty as either of these two conditions would result in erroneous output data.

Buffer 1020 provides data packets to consumer module 1030. Consumer module 1030 receives data packets from buffer 1020 and sends the data packets to an external device (such as HD decoder 935). The rate at which consumer module 1030 consumes data packets is solely determined by the value of the clock rate provided to consumer module 1030 by controller 1040. The goal of controller 1040 is to adjust the clock rate of consumer module 1030 so that buffer 1020 follows the data rate of producer module 1010 and so that buffer 1020 remains approximately half full. Buffer 1020 provides controller 1040 with a signal that indicates the fullness of 1020.

The frequency with which controller 1040 is invoked is the sample rate. The sample rate is provided to controller 1040 by sample rate module 1050. Controller 1040 adjusts the clock rate every sample rate so that the fullness of buffer 1020 remains approximately fifty percent (50%).

Producer module 1010 fills buffer 1020 at a rate between one megabit per second (1 Mb/s) and twenty megabits per second (20 Mb/s). Consumer module 1030 empties buffer 1020 at a rate between one megabit per second (1 Mb/s) and twenty megabits per second (20 Mb/s) depending upon the clock rate provided by controller 1040.

In an advantageous embodiment controller 1040 comprises a digital phase locked loop (PLL) circuit (not shown). An error signal E may be calculated by subtracting the number of packets in buffer 1020 from the number twenty (20). The error signal E is then multiplied by a constant K and fed back to the clock rate. This relationship may be expressed by the equation:

$$\text{Clock rate }[n] \text{ Clock rate }[n-1]+K*E$$

where n represents an individual sample time.

The phase locked loop (PLL) circuit of controller 1040 adjusts the clock rate of consumer module 1030 so that buffer 1020 does not overflow (i.e., exceed forty (40) packets) or underflow (i.e., reach zero (0) packets).

The advantageous embodiment of the present invention described with reference to FIG. 9 employs clock rate control circuit 1000 in BRT' unit 925. In an alternate advantageous embodiment of the present invention, a similar clock rate control circuit (not shown) may be employed in the output component of each of the ERT' units, 910, 920, and 925, to adjust the bitrate of the output of each of the BRT' units. In this alternate advantageous embodiment it is not necessary to generate and add empty data packets as in the previously described case.

Bitrate transcoding is only one type of multimedia processing that may be achieved using the apparatus and method of the present invention. The apparatus and method of the present invention may be used to process other types of multimedia signals in media processors using the parallel slice parsing method.

Figure 11:
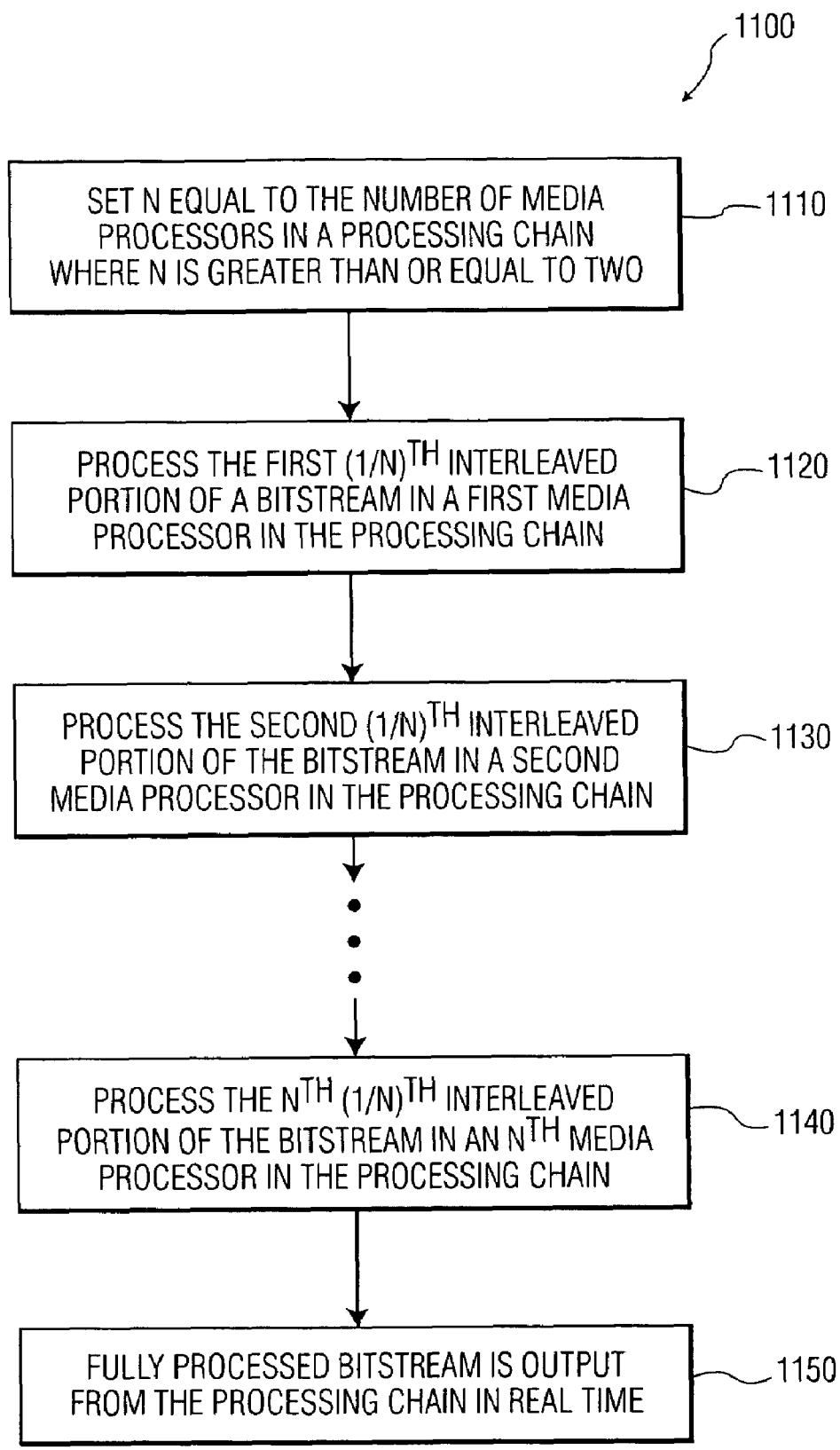
FIG. 11 is a flow chart diagram illustrating an advantageous embodiment of a parallel slice parsing method according to the present invention.

FIG. 11 is a flow chart diagram illustrating an advantageous embodiment of a parallel slice parsing method according to the present invention. The steps of the method will be generally designated by reference numeral 1100. Let N equal the number of media processors in the processing chain that is processing an incoming multimedia bitstream. (Step 1110). The number N is an integer that is greater than or equal to two (2).

The first media processor in the processing chain processes the first $(1/N)^{th}$ interleaved portion of the bitstream (Step 1120). Then the second media processor in the processing chain processes the second $(1/N)^{th}$ interleaved portion of the bitstream (Step 1130). This process continues for each of the media processors in the processing chain. The continuation of the process for each media processor is indicated in FIG. 11 by the ellipsis (three dots) between Step 1130 and Step 1140.

The last media processor in the processing chain is the Nth media processor. The $N^{th}$ media processor in the processing chain processes the $N^{th}$ $(1/N)^{th}$ interleaved portion of the bitstream (Step 1140). The fully processed bitstream is then output from the processing chain in real time (Step 1150).

Figure 12:
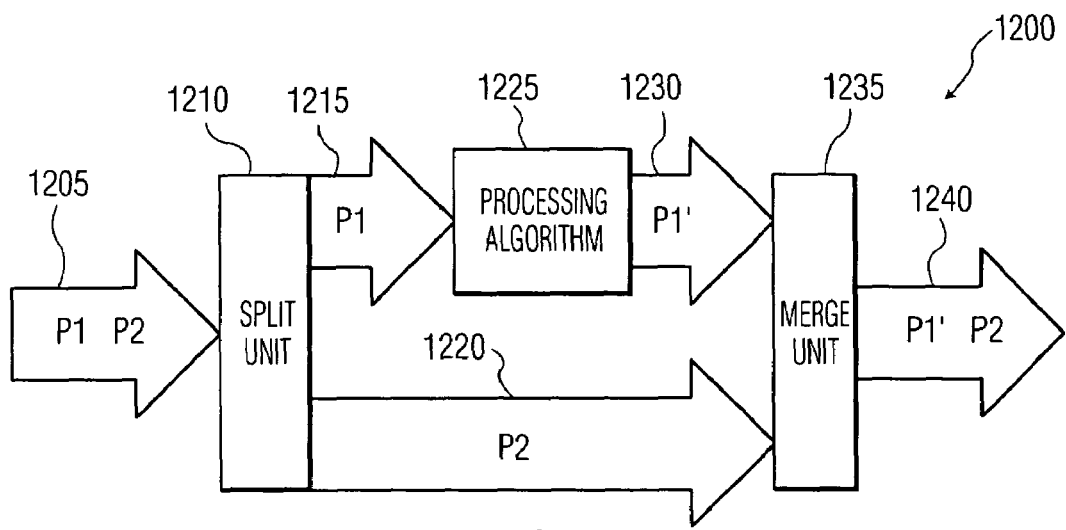
FIG. 12 is a block diagram that illustrates the operation of the parallel media processor of the present invention in which a first portion of a media stream is processed.

FIG. 12 is a block diagram that illustrates the operation of the parallel media processor of the present invention in which a primary stream portion of a media stream is processed by a multimedia processing algorithm. Assume that P1 represents a first distinctive portion of a video stream (e.g., the upper half of a video frame) and that P2 represents a second distinctive portion of a video stream (e.g., the lower half of a video frame).

In the same manner as that described for bitrate transcoding, the video stream may be split and merged by the parallel slice parsing method described above. The video stream data flows in real time through the entire chain. Partially processed video stream data is transferred in real time between each media processor.

FIG. 12 is a block diagram that illustrates a first portion of the operation of a media processor. The first portion of the operation is generally designated with the reference numeral 1200. The incoming bitstream 1205 is represented by the designations "P1" and "P2". The designations "P1" and "P2" each represent a portion or "slice" of bitstream 1205. Split unit 1210 splits bitstream 1205 into a primary stream 1215 and a secondary stream 1220. As indicated in FIG. 12, primary stream 1215 comprises the portion of bitstream 415 represented by the designation "P1". Secondary stream 1220 comprises the remainder of bitstream 1205. That is, secondary stream 1220 comprises the portion of bitstream 1205 represented by the designation "P2".

Processing algorithm unit 1225 processes primary stream 1215 to produce processed primary stream 1230. Primary processed stream 1230 comprises the processed portion of bitstream 1205 represented by the designation "P1'". The prime on a designated slice of bitstream indicates that the processing operation has been performed on that slice of bitstream. Processed primary stream 1230 and secondary stream 1220 are combined in merge unit 1235 to create partially processed stream 1240. As shown in FIG. 12, partially processed stream 1240 comprises the portions of bitstream 1205 represented by the designations "P1'" and "P2". At this stage of the operation one half (½) of the bitstream slices of bitstream 1205 have been processed.

Figure 13:
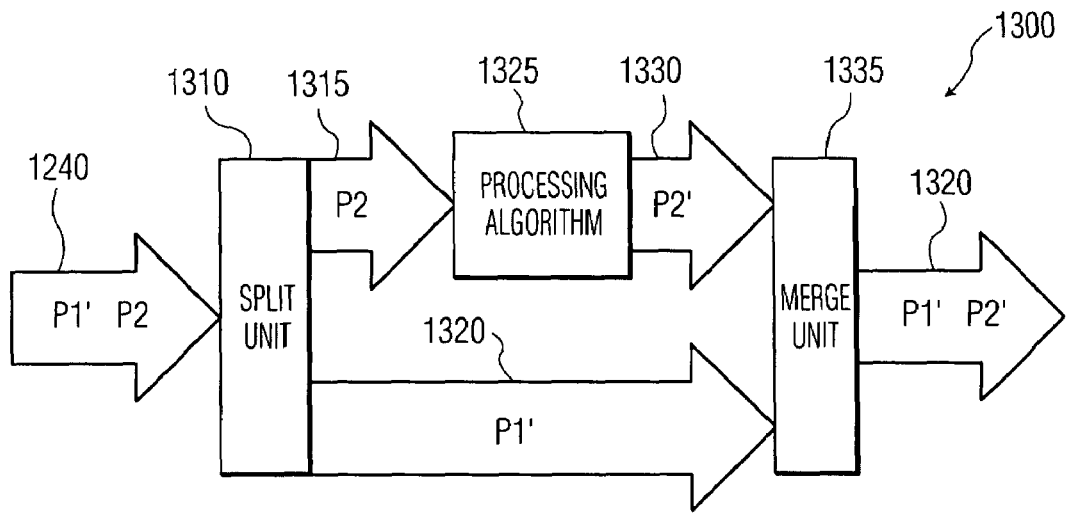
FIG. 13 is a block diagram that illustrates the operation of the parallel media processor of the present invention in which a second portion of the media stream of FIG. 12 is processed.

FIG. 13 is a block diagram that illustrates a second portion of the operation of a media processor. The second portion of the operation is generally designated with the reference numeral 1300. The incoming bitstream 1240 is the same as the output from the first portion of the operation 1200. Bitstream 1240 is represented by the designations "P1'" and "P2". Each designation represents a portion or "slice" of bitstream 1240. Split unit 1310 splits bitstream 1240 into a primary stream 1315 and a secondary stream 1320. As indicated in FIG. 13, primary stream 1315 comprises the portions of bitstream 1240 represented by the designation "P2". Secondary stream 1320 comprises the remainder of bitstream 1240. That is, secondary stream 1320 comprises the portion of bitstream 1240 represented by the designation "P1'".

Processing algorithm unit 1325 processes primary stream 1315 to produce processed primary stream 1330. Primary processed stream 1330 comprises processed portions of bitstream 1240 represented by the designation "P2'". Processed primary stream 1330 and secondary stream 1320 are combined in merge unit 1325 to create partially processed stream 540. As shown in FIG. 13, partially processed stream 1340 comprises portions of bitstream 1240 represented by the designations "P1'" and "P2'". At this stage of the operation all of the bitstream slices of bitstream 1205 have been processed.

Figure 14:
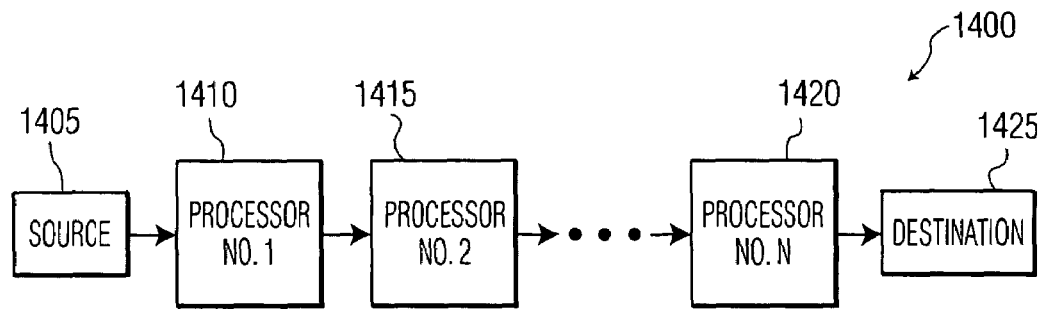
FIG. 14 is a block diagram that illustrates a cascaded video chain for parallel processing a media stream according to the present invention.

FIG. 14 is a block diagram that illustrates a processing chain 1400 for processing a bitstream of a multimedia signal using the parallel processing apparatus and method of the present invention. In this exemplary embodiment multimedia signal source 1405 provides a multimedia signal to a processing chain that comprises N processor units. The N processor units are processor unit Number One 1410, processor unit Number Two 1415, and processor unit Number N 1420. The fully processed output of processor unit Number N 1420 is provided destination module 1425.

A clock control circuit of the type represented by clock control circuit 1000 may be used in the last processor unit (i.e., processor unit Number N 1420) to adjust the output bitstream rate of processing chain 1400. Alternatively, a clock control circuit may be used in the output component of each of the processor units (1410, 1415, 1420) of processing chain 1400 to adjust the output bitstream rate of each processor unit.

Although the present invention has been described in detail, those skilled in the art should understand that they can make various changes, substitutions and alterations herein without departing from the spirit and scope of the invention in its broadest form.

What is claimed is:

1. An apparatus capable of processing a multimedia digital bitstream, said apparatus comprising:
 a processing chain comprising:
   a plurality of N media processors wherein each of said plurality of media processors including a bitrate transcoder unit capable of transcoding a portion of said multimedia digital bitstream, said media processors being capable of processing a portion of said multimedia digital bitstream, wherein said bitrate transcoder unit includes at least one of a split unit a BRT' transcoder, and a merge unit, and said portion represents a $(1/N)^{th}$ interleaved portion of the bitstream, each of said plurality of media processors capable of splitting said portion of said multimedia digital bitstream into a primary bitstream and a secondary bitstream, and capable of processing said primary bitstream, and capable of merging a processed primary bitstream with said secondary bitstream.

2. The apparatus as claimed in claim 1 wherein the number of said plurality of media processors may vary from two to N, where N is an integer number greater than two.

3. The apparatus as claimed in claim 1 wherein said multimedia digital bitstream comprises a high definition digital video signal.

4. The apparatus as claimed in claim 1 wherein said bitrate transcoder unit comprises:
 an output component that is capable of generating empty data packets and adding said empty data packets to the output of said bitrate transcoder unit.

5. The apparatus as claimed in claim 4 further comprising a clock control circuit in an output component of a last bitrate transcoder unit that is located at an output end of said processing chain, wherein said clock control circuit is capable of adjusting a clock rate of an output of said last bitrate transcoder unit in said processing chain.

6. The apparatus as claimed in claim 1 wherein said processing chain further comprises:
 an input block coupled to a first media processor in said processing chain, wherein said input block is capable of receiving multimedia data in real time from one of: a computer file, a bitpump, and a radio frequency front end; and an output block coupled to a last media processor in said processing chain, wherein said output block is capable of outputting multimedia data in real time in one of: a computer file format, and a transport stream format.

7. A television unit comprising an apparatus capable of processing a multimedia digital bitstream, said apparatus comprising:

a processing chain comprising;

a plurality of N media processors wherein each of said plurality of media processors including a bitrate transcoder unit capable of transcoding a portion of said multimedia digital bitstream, said media processors being capable of processing a portion of said multimedia digital bitstream, said bitrate transcoder unit includes at least one of a split unit, a BRT' transcoder, and a merge unit, and said portion represents a $(1/N)^{th}$ interleaved portion of the bitstream, each of said plurality of media processors is capable of splitting said portion of said multimedia digital bitstream into a primary bitstream and a secondary bitstream, and capable of processing said primary bitstream, and capable of merging a processed primary bitstream with said secondary bitstream.

8. The television unit as claimed in claim 7 wherein the number of said plurality of media processors may vary from two to N, where N is an integer number greater than two.

9. The television unit as claimed in claim 7 wherein said multimedia digital bitstream comprises a high definition digital video signal.

10. The television unit as claimed in claim 7 wherein said bitrate transcoder unit comprises an output component that is capable of generating empty data packets and adding said empty data packets to the output of said bitrate transcoder unit.

11. The television unit as claimed in claim 10 further comprising a clock control circuit in an output component of a last bitrate transcoder unit that is located at an output end of said processing chain, wherein said clock control circuit is capable of adjusting a clock rate of an output of said last bitrate transcoder unit in said processing chain.

12. The television unit as claimed in claim 7 wherein said processing chain further comprises:

an input block coupled to a first media processor in said processing chain, wherein said input block is capable of receiving multimedia data in real time from one of: a computer file, a bitpump, and a radio frequency front end; and an output block coupled to a last media processor in said processing chain, wherein said output block is capable of outputting multimedia data in real time in one of: a computer file format, and a transport stream format.

13. A method for processing a multimedia digital bitstream, wherein at least a portion of said multimedia digital bitstream is capable of being transcoded via at least one bitrate transcoder associated with one or more N media processors suitable for processing at least a portion of said multimedia digital bitstream, each bitrate transcoder including at least one of a split unit, a BRT' transcoder, and a merge unit, said method comprising the steps of:

processing a portion of said multimedia digital bitstream in each of said N media processors of a processing chain, wherein said portion represents a $(1/N)^{th}$ interleaved portion of the bitstream, each of said media processors executing the steps of:

splitting an associated portion of said multimedia digital bitstream into a primary bitstream and a secondary bitstream;

processing said primary bitstream; and merging a processed primary bitstream with said secondary bitstream.

14. The method for processing a multimedia digital bitstream as claimed in claim 9 wherein the step of processing said primary bitstream comprises the step of:

transcoding said primary bitstream in a bitrate transcoder unit.

15. The method for processing a multimedia digital bitstream as claimed in claim 14 further comprising the steps of:

generating empty data packets in an output component of said bitrate transcoder unit; and adding said empty data packets to the output of said bitrate transcoder unit.

16. The method for processing a multimedia digital bitstream as claimed in claim 15 further comprising the step of:

adjusting a clock rate of an output of at least one bitrate transcoder unit in said processing chain with a clock control circuit.

* * * * *